July 2, 1968 L. C. HRUSCH 3,390,742
FRICTION SHOCK ABSORBER
Filed Dec. 13, 1966
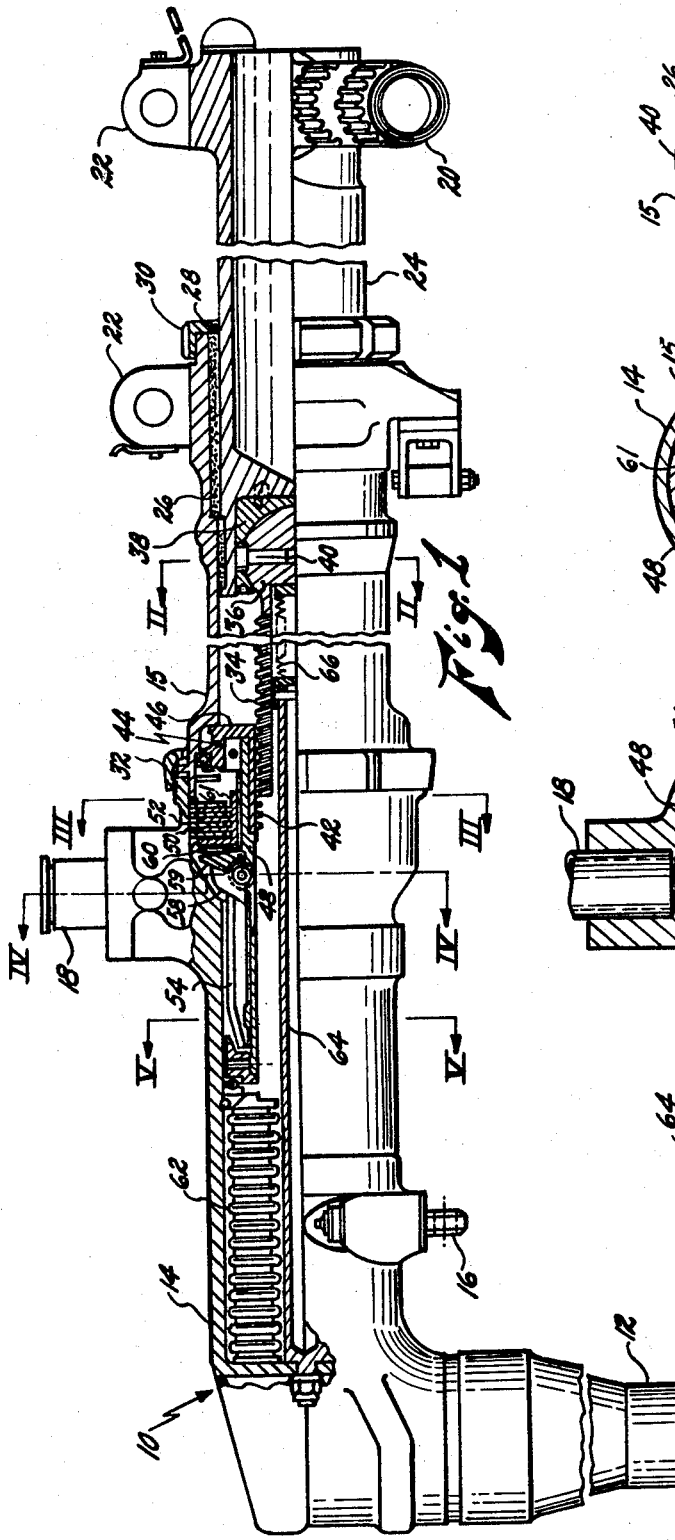
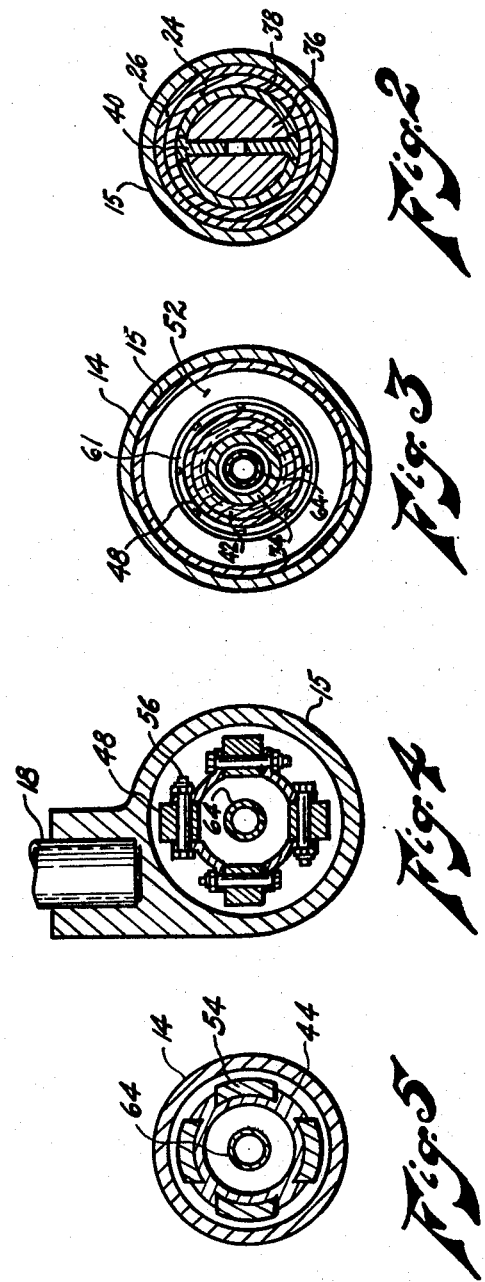
INVENTOR.
LOUIS C. HRUSCH
BY Harry A. Herbert Jr.
Sherman H. Goldman
ATTORNEYS United States Patent Office 3,390,742
Patented July 2, 1968

3,390,742
FRICTION SHOCK ABSORBER
Louis C. Hrusch, Chesterland, Ohio, assignor to the United States of America as represented by the Secretary of the Air Force
Filed Dec. 13, 1966, Ser. No. 601,829
4 Claims. (Cl. 188—1)

This invention relates generally to shock absorbing systems and, more particularly, to a shock absorbing system which utilizes friction energy absorption methods.

Conventional aircraft landing gear with fluid shock absorbing systems are generally adversely affected by large sudden temperature variations as well as temperature extremes.

In this invention, it is proposed to take advantage of the fact that friction methods have high energy absorption capacities and are relatively insensitive to temperature variations in that the coefficient friction is not affected. The importance of rendering the energy absorption system insensitive to temperature variations produces a requirement that the friction device be operable up to 2500° F., which might be encountered under rejection-off conditions. Another problem of friction devices, which are utilized as shock absorbers involves the provision of a sufficient spread between the static and sliding coefficient of friction which tends to produce initial loads which are higher than the loads of the major portion of the stroke. This problem, however, i.e., the problem of breakaway friction, may be incorporated and compensated for by the design.

An additional requirement of a landing gear shock absorber system is the provision of a taxi spring which would allow for shock absorption during taxi operations; however, if there is sufficient deflection in the wheel assembly for taxi conditions, no spring travel in the shock absorbers is necessary.

To overcome the disadvantages of air-oil type systems with regard to temperature extremes protection from the environment requires expensive and difficult to maintain seals, together with oils and fluids that change their characteristics with temperature. The automotive braking materials which are contemplated for use in this device, still require the use of seals in order to prevent moisture, grease, sand and dust, from influencing the performance; however, these seals may be of the low cost type. Additionally, although high temperatures may be encountered and easily managed by the braking material, it is contemplated that the instant design would avoid utilizing the portion of the shock absorber which would be at high temperatures from carrying the landing loads.

The solution of the problems and the meeting of the required design parameters have resulted in a design which includes a mechanical means of overcoming the high breakaway friction together with a sealing of the assembly from the environment. The weight of the system is kept to a minimum while still maintaining high strength and, by having a highly efficient energy absorption characteristic, stroke length is reduced along with the weight reduction. The unit is easily maintained and is adapted to designs presently incorporated in aircraft landing systems.

Accordingly, it is an object of this invention to provide a shock absorber based on friction energy absorption methods.

It is another object of this invention to provide a shock absorber system which is adaptable for high temperature use.

It is still another object of this invention to provide a shock absorber having high energy absorption capacity which utilizes friction methods which are relatively insensitive to temperature variations.

It is a further object of this invention to provide a friction type shock absorber which is easy to service and maintain.

It is a still further object of this invention to provide a friction energy absorption system for shock absorbers which is capable of being adapted to systems currently utilizing other methods of energy absorption.

Another object of this invention involves the production of a shock absorber based on friction energy absorption which has long life and low weight.

Still another object of this invention involves the production of a shock absorber capable of being utilized at high temperatures wherein the parts exposed to high temperatures do not carry the heavy loads of the shock absorber.

A further object of this invention involves the provision of a friction shock absorber with a governor controlled rotary action.

These and other advantages, features and objects of the invention will become more apparent from the following description taken in connection with the illustrative embodiments in the accompanying drawings, wherein:

FIGURE 1 is a view partly in cross section of the shock absorbing system of this invention;

FIGURE 2 is a section along lines II—II of FIGURE 1;

FIGURE 3 is a sectional view along lines III—III of FIGURE 1;

FIGURE 4 is a sectional view along lines IV—IV; and

FIGURE 5 is a sectional view along lines V—V of FIGURE 1.

Referring to the figures, and more particularly to FIGURE 1, there is shown a landing gear shock strut which is currently used on the F-100 aircraft which has been modified to incorporate the principles of this invention, i.e., the utilization of friction energy absorption methods. Since this invention is adaptable to the conventional F-100 landing gear system, many of the elements are the same as in a conventional unit.

Numeral 10 is utilized to designate the entire landing gear shock strut which has a trunnion 12 attached to the upper end of the outer cylinder 14 that mounts the shock strut to the wing structure of the aircraft. Attachment point 16 for the retraction actuators of the aircraft and side brace 18 are also located on the outer cylinder 14. A single high pressure tire, not shown, is mounted aft and outboard of the strut center line on a wheel axle 20. Torque arm links 22 are mounted on cylinder 14 and piston 24 in order to prevent relative rotation of the cylinder and piston. Mounted between the piston 24 and cylinder 14 is a packing material 26 which together with an O-ring 28 provides a sealing means to prevent foreign matter from entering the system. A nut 30 which is threadably engaged with the cylinder 14 engages the O-ring 28 and packing material 26 to maintain it in its proper position. The cylinder 14 has an extension 15 attached to it by means of a nut 32 in order to provide for separation of the cylinder in order to insert the parts necessary to be mounted therein.

The unit 10 thus far described is basically the same as the typical cantilever, single wheel, air-oil unit of the usual F-100 landing gear shock strut. From this point on the F-100 main landing gear unit is modified to incorporate the friction energy absorption device of this invention.

The friction energy modification incorporated in the conventional F-100 landing gear includes a multiple disc type of brake unit with both rotating and stationary discs.

The brake unit is driven by an overhauling acme screw 34 which has a quintuple thread which is ball ended at 36 to run concentrically in the cylinder 14 and eliminates strut deflection effects in the unit. The ball end 36 of the acme screw 34 is effectively secured in the piston 24 by means of an insert 38 secured to the piston. As can be seen in FIGURE 2, which is a section along lines II—II of FIGURE 1 through the ball end of the acme screw, pins 40 extend from the insert 38 into the ball end 36 thereby forming an universal joint.

The linear forces which cause relative movement between the piston 24 and cylinder 14 are transmitted through the acme screw 34 to a rotating aluminum-bronze nut 42. When the helix angle of the acme screw 34 is sufficiently great or the coefficient of friction is small, the axial load may be sufficient to turn the nut 42, therefore, the screw is said to "overhaul." The nut in turn transmits the angular velocity to a sprag one-way clutch 44 which drives the governor weights and rotors of the brake assembly.

The sprag one-way clutch 44 has an element 46 attached to the aluminum-bronze nut 42 for operation thereby. The element 46 of the sprag clutch is arranged by means of the conventional balls or sprags operating in tapered slots to operate an element 48 to which are mounted a series of rotatable brake discs 50. A series of stator brake discs 52 are placed between adjacent rotor discs 50. Also driven by the sprag clutch element 48 are a series of circumferentially arranged governor weights 54.

Thus, the overhauling acme screw 34 transmits the linear forces applied thereto to a rotating nut 42 which transmits the angular velocity through the sprag clutch 44 to drive both the governor weights 54 and the rotors 50 of the multiple disc brake unit. The governor weights 54 are mounted to element 48 of the sprag clutch, as is shown most clearly in FIGURE 4, by means of bolts 56. When centrifugal force causes the weighted arms 54 to change their plane of rotation, the cam end 58 of the governor weights presses a shoe 59 against a Belleville spring 60 to cause movement of the rotor discs 50 against stator discs 52. In order to allow for movement of the rotor discs, they are mounted to a member 61 which is slidable on element 48. The Belleville spring washer 60 was chosen since it has a nearly zero rate or a practically horizontal load deflection curve at the flat position. Accordingly, it causes a more nearly constant load for short motions than that would otherwise be obtained if the axial load was applied directly to the discs. Without the springs the load would be proportional to the square of velocity. By choosing proper spacing elements the Belleville washer enables the setting of minimum friction loads.

The sprag clutch 44 was chosen since it compensates for wear of the brake discs and thereby eliminates need for adjustment; however, a means for measuring wear is still capable of being applied.

The device incorporates bellows in order to overcome the problems of providing high pressure to support the aircraft at static positions with a minimum of weight. The overhauling screw 34, therefore, is arranged to contact a high pressure toroidal welded bellows 62 which abuts the end of cylinder 14, and this provides for support of the aircraft and acts as an air spring for taxiing while on the ground. Within the overhauling acme screw 34 and the high pressure welded bellows 62 is a low pressure welded bellows 64 which provides for a return of the piston to its extended position upon load release. A spring 66 extending between the end of bellows 64, remote from the end of cylinder 14, and the ball end 36 of screw 34 further aids in proper piston return.

Each of the bellows requires conventional external pressurization or charging systems and pressure relief valves, not shown. It is contemplated that the charging systems would have its charging valve automatically operated.

Thus, there has been described a self-energizing shock absorber which utilizes a multiple disc type of brake unit with rotating and stationary discs. The linear force of the shock absorbing system transmits the force through an overhauling acme screw, a rotatable nut and a sprag one-way clutch which drives governor weights and the rotors of the brake assembly. The governor weights apply their force through a Belleville spring to the rotating discs of the brake unit in order to provide compensation for the initial, breakaway type of friction. The shock absorber assembly also has means for providing support for the aircraft at its static position, thus eliminating heavy mechanical springs and additionally includes means for returning the shock absorbing unit to its extended position.

Although the invention has been described with reference to a particular embodiment, it will be understood to those skilled in the art that the invention is capable of a variety of alternative embodiments within the spirit and scope of the appended claims.

I claim:
1. A shock absorber which utilizes friction as the energy dissipator comprising:
   a pair of members linearly and relatively moveable,
   an overhauling screw means connected to one of said members,
   a rotating nut in engagement with said screw, said nut being mounted for rotation upon linear movement of said screw,
   a multiple disc type brake unit having stationary and rotating discs,
   a plurality of governor weights connected for rotation with said rotating discs of said brake unit,
   sprag clutch means connecting the rotating discs of said brake unit and said governor weights with said nut for rotation thereby, and
   cam means on said governor weights for applying a braking force to cause said rotating discs to bear against said stationary discs.

2. A shock absorber as defined in claim 1 including resilient means between said screw means and the other of said members for providing auxiliary shock absorption.

3. A shock absorber as defined in claim 2 wherein said resilient means comprises a toroidal bellows.

4. A shock absorber as defined in claim 1 including resilient means between said screw means and the other of said members for returning said members to a shock absorbing position.

References Cited
UNITED STATES PATENTS

| | | | |
|---|---|---|---|
| 2,856,179 | 10/1958 | Hogan | 188—129 X |
| 3,059,727 | 10/1962 | Fuchs | 188—1 |

DUANE A. REGER, *Primary Examiner.*